WATER-IN-OIL EMULSION USEFUL AS FIRE-RESISTANT HYDRAULIC FLUID

Edgar A. Dieman, Crown Point, and James W. Gaynor, Valparaiso, Ind., assignors to Standard Oil Company, Chicago, Ill., a corporation of Indiana
No Drawing. Filed June 28, 1965, Ser. No. 467,741
4 Claims. (Cl. 252—75)

This is a continuation-in-part of application Ser. No. 241,129 Nov. 30, 1962 now abandoned.

This invention relates to fire-resistant hydraulic fluids and more particularly to water-in-oil emulsions as fire-resistant hydraulic fluids, which exhibit superior stability and anti-wear properties, and to oil concentrates for such water-in-oil emulsions.

Fire-resistant hydraulic fluids are known and have been widely accepted, particularly by the mining industry. These fire-resistant fluids offer particular benefits in the operation of hydraulic systems in mines where the dangers of fire are so evident and the need to prevent such fires is so important.

Among the fire-resistant hydraulic fluids used in the past have been water-in-oil emulsions. Many of these emulsions have exhibited a desired combination of fire-resistant properties and lubricating properties. However, their other properties have not always been satisfactory. Some of the emulsions tend to break down or separate upon standing which in a hydraulic system means that many metal parts are exposed to a separate water phase. This results in increased corrosion wear of the metal parts. Also, some of the emulsions fail to pass such industrial tests as the 1000 hour test contacted on a Vickers Pump wherein the total wear on the parts is required to be about 0.1% or less. In addition, many of the emulsions tend to generate foam which produces gas pockets and high wear due to cavitation in the pump. Another important problem with the emulsions concerns their use at low temperatures. In some instances, the emulsions are not entirely stable at low temperatures.

It is an object of this invention to provide a water-in-oil emulsion as a fire-resistant hydraulic fluid. Another object is to provide an emulsion with good stability properties. Still another object is to provide an emulsion with good anti-wear and anti-oxidant properties and the ability to pass the 1000 hour Vickers Pump Test. Still another object is to provide an emulsion with good anti-foam properties. Yet another object is to provide an emulsion with good low temperature stability properties. A further object is to provide an emulsion with a good combination of these properties. Other objects will become apparent from the detailed description of the invention.

It has been discovered that a very desirable water-in-oil emulsion results from an oil composition comprising a major amount of an oil having a viscosity in the range of about 80–200 SSU at 100° F., and a minor amount of a mixture of (1) a polyoxyalkylene derivative of a partial ester of a 6 carbon polyhydric alcohol and a fatty acid, such as a polyoxyethylene derivative of a partial ester of sorbitan and oleic acid, (2) a partial ester of a 6 carbon polyhydric alcohol and a fatty acid, such as that of sorbitan and oleic acid, and (3) a barium salt of a reaction product of $P_2S_5$ and a butylene polymer. The improved stability of the emulsion formed from the above oil composition is very desirable. It has also been found that the incorporation of a zinc dialkyl dithiophosphate into the mixture improve the anti-wear properties and antioxidant properties of the resultant water-in-oil emulsion. It has further been found that the foaming tendencies of the emulsion are substantially reduced through the addition of a small amount of a polyalkyl siloxane. In addition, it has been found that the low temperature stability properties of the emulsion are improved by the addition of a small amount of a lower alkyl polyol such as propylene glycol.

The water-in-oil emulsion of this invention comprises at least about 30 volume percent of water, usually about 30 to about 50 volume percent, and preferably from about 33 to about 43 volume percent of water, and below about 70 volume percent, usually between about 70 and about 50 volume percent, and preferably from about 67 to about 57 volume percent of an oil composition containing an oil having a viscosity in the range of about 80–200 SSU at 100° F. and a minor amount of a mixture of (1) a polyoxyalkylene derivative of a partial ester of a 6 carbon polyhydric alcohol and a fatty acid, (2) a partial ester of a 6 carbon polyhydric alcohol and a fatty acid, and (3) a barium salt of a reaction product of $P_2S_5$ and a butylene polymer. The emulsion may include a zinc dialkyl dithiophosphate to improve its anti-wear and anti-oxidant properties, a polyalkyl siloxane to improve its anti-foam properties, and a glycol to further improve its stability.

The oil utilized for the water-in-oil emulsion of this invention is generally characterized by a viscosity in the range of about 80–200 SSU at 100° F. Suitable oils having this property are known in the art. A preferred oil is a mineral oil and especially a solvent extracted mineral oil produced from a lubricating oil fraction which is a distillation product of a midcontinent crude containing substantial amounts of paraffinic hydrocarbons.

The emulsifiable oil composition which is utilized for the desired water-in-oil emulsion also contains a mixture of a polyoxyalkylene derivative of a partial ester of a 6 carbon polyhydric alcohol and a fatty acid and a partial ester of a 6 carbon polyhydric alcohol and a fatty acid. Usually, these may also be described as a polyoxyalkylene derivative of a fatty acid partial ester of a 6 carbon polyhydric alcohol mono- or di-anhydride and the fatty acid partial ester, incluing mixtures based on each and on both ingredients. The defined polyoxyalkylene derivative contains from about 1 to about 4 carbon atoms in the alkylene radical and includes such groups as polyoxymethylene, polyoxyethylene, polyoxypropylene, and polyoxybutylene, with the lower polyoxyalkylene groups being preferred, especially polyoxyethylene since it is readily available and its use results in a highly desirable emulsion.

The 6 carbon polyhydric alcohol includes sorbitan, sorbide, mannitan, mannide, dulcitan, and dulcide, with sorbitan being especially preferred.

The fatty acid portion of the partial ester has from 6 to about 30 carbon atoms and preferably from about 12 to about 18 carbon atoms. Some examples of the fatty acids useful when chemically combined to form partial esters in accordance with the present invention are caproic, sorbic, pelgaronic, capric, lauric, myristic, palmtitc, margaric, stearic, oleic, linoleic, linolenic, arachidic, behenic, cerotic, and melissic, with oleic acid being especially preferred. An especially preferred polyoxyalkylene derivative is a polyoxyethylene derivative of a partial ester of sorbitan and oleic acid, particularly a monoester.

The fatty acid partial ester of a 6 carbon polyhydric alcohol mono- or di-anhydride is the next component of the mixture. Examples of suitable partial esters are those described above for the defined polyoxyalkylene derivative. An especially preferred partial ester is that of sorbitan and oleic acid, particularly a monoester.

The first two components are further described in U.S. 2,965,574, issued Dec. 20, 1960, to Raymond B. Tierney et al. and in "Atlas Surface Active Agents" by the Atlas Powder Company, Wilmington, Delaware, copyright, 1950. In the latter publication, many suitable water-in-oil emulsions are disclosed and further described in terms of their HLB (a hydrophile-lipophile balance), with a particularly suitable HLB range being from about 3.5 to about 6.0.

Of the suitable water-in-oil emulsions produced with the above components, it has been found that a water-in-oil emulsion produced from a mixture of a polyoxyethylene derivative of sorbitan oleate and a sorbitan monooleate which has a resultant HLB number of about 5.4 and a barium salt of a reaction product of $P_2S_5$ and a butylene polymer, exhibits especially desirable stability properties.

The barium salt of the reaction product of $P_2S_5$ and a butylene polymer is of the type described in U.S. 3,002,925, issued on Oct. 3, 1961, to Albert R. Sabol and Robert E. Karll. In general, the butylene polymer refers to monoolefinic polymers of mixtures of monoolefinic polymers and iso-monoolefinic polymers and especially those having molecular weights ranging from about 150 to about 50,000. The $P_2S_5$ and the butylene polymer are normally reacted at a temperature of about 150° F. to about 600° F. and preferably from about 300° F. to about 500° F. The reaction is carried out in from 1 to about 10 hours. The reaction product is hydrolyzed with water or steam, is neutralized with barium oxide, and is then filtered. Typical barium salts have barium, phosphorus and sulfur percentages by weight of 1.4–2.1, 0.9–1.2, and 5.7–7.9, respectively.

In general, the defined polyoxyalkylene derivative of the defined partial ester and the defined partial ester are present in the mixture in a respective weight ratio of about 0.1–1.0:3–6; although emulsions may be prepared from mixtures having relative ratios outside these ranges. The defined barium salt is present in the mixture of the oil composition in an amount sufficient to produce a stable water-in-oil emulsion, with this amount generally being at least about 2% by weight of the oil composition. It is preferred that the weight ratio of defined polyoxyalkylene derivative, defined partial ester, and defined barium salt be about 0.1–1.0:3–6:3–6. A particularly suitable emulsion is prepared from an oil composition containing about 0.5% by weight of the defined polyoxyethylene derivative of a monoester of sorbitan and oleic acid, about 4.5% by weight of the defined monoester of sorbitan and oleic acid, and about 4.0% by weight of the defined barium salt of a reaction product of $P_2S_5$ and a butylene polymer in addition to the oil.

Generally, only a minor amount of the mixture need be present in the oil in order to produce the desired emulsion, although when the oil composition is employed as a concentrate, the minor amount may be substantial. Normally, the amount is at least about 7% by weight of the oil composition (oil plus mixture) and below about 15% by weight. Usually, the amount is from about 7 to about 9 weight percent since the higher amounts of the mixture tend to increase viscosity of the emulsion.

The defined mixture may also include an oil soluble, zinc dialkyl dithiophosphate to improve the anti-wear and antioxidant properties of the resultant emulsion. The alkyl groups of the zinc dialkyl dithiophosphate contain from about 1 to about 20 carbon atoms. In general, oil solubility is obtained through a mixture of different alkyl groups or by a higher alkyl group. The combination of different alkyl groups may be methyl and eicosyl, ethyl and pentadecyl, or isopropyl and decyl groups. Suitable single alkyl groups are hexyl, octyl, dodecyl, and the like.

In general, the amount of zinc dialkyl dithiophosphate is not over about 1% by weight of the oil composition and preferably between about 0.3% and about 0.7% with about 0.5% being especially preferred. It is to be understood that these percentages are suitable with the previously described weight ratios of the defined polyoxyalkylene derivatives, defined partial ester, and defined barium salt of about 0.1–1:3–6:3–6.

When low temperature properties are desired, it is advantageous to incorporate a lower alkyl polyol into the emulsion. Normally, this is done by adding the polyol to the water phase prior to producing the emulsion. The amount of the polyol is generally below about 5% by volume (based on the volume of water plus oil composition containing the defined mixture) and preferably from about 0.5% to about 3% by volume with a more practical limit of about 1% by volume, especially with the lower alkylene polyols, and particularly with propylene and ethylene glycols.

Another component may also be added in the event that anti-foam properties are desired in the emulsion. This component is described as a polyalkyl siloxane. Preferably the polyalkyl siloxane has a viscosity in the range of about 200 to about 1000 centistokes at 25° C. A preferred polyalkyl siloxane is that having a viscosity of approximately 1000 centistokes at 25° C. The alkyl group includes methyl and ethyl. Mixtures of alkyl groups may also be employed.

Normally, only a minute amount of polyalkyl siloxane is necessary to impart the desired anti-foam properties in the emulsion. Generally, this is below about 30 parts per million and preferably from about 1 part to about 30 parts per million, with especially desirable results being obtained from about 10 parts per million based on an oil composition containing about 0.5 part by weight of the defined polyoxyalkylene derivative, 4.5 parts by weight of the defined partial ester, 4.0 parts by weight of the defined barium salt, and 0.5 part by weight of the defined zinc dialkyl dithiophosphate, in addition to the oil.

The preparation of the emulsion is carried out by conventional means. In general, violent agitation with gradual addition of water is necessary to produce the emulsion and may be obtained by such methods as mechanical stirring, pumping through an orifice, and the like.

The combination of the above-described components (defined polyoxyalkylene derivative, defined partial ester, defined barium salt, defined zinc dialkyl dithiophosphate, defined polyol and defined siloxane) produces a water-in-oil emulsion which is very suitable for use as a fire-resistant hydraulic fluid. Very good stability is exhibited by the emulsion, together with very desirable anti-wear and antioxidant properties, low temperature properties, and anti-foam properties.

The following examples illustrate the preparation and utilization of some embodiments of this invention. It will be understood that these are for illustrative purposes only and do not purport to be wholly definitive with respect to conditions or scope.

*Example I*

Emulsifiable oil compositions were formulated containing the components listed in Table I below. Atpet 200 is an oil-soluble emulsifying agent known to the trade and identified by Atlas Powder Company as sorbitan monooleate. Tween 80 is a water-soluble emulsifiable agent known to the trade and identified by Atlas Powder Company as a polyoxyethylene sorbitan monooleate. The third component is a barium salt of a reaction product of $P_2S_5$ and a butylene polymer containing approximately 5.46% Ba, 2.10% P and 9.95% S by weight. The fourth component is an oil soluble zinc dialkyl dithiophosphate wherein the alkyl portion is a mixture of isopropyl and decyl radicals. The oil was a solvent extracted lubricating oil fraction, having a viscosity of about 150 SSU of 100° F., distilled from a midcontinent crude. (After addition of additives, the mixture has a viscosity of 175 SSU at 100° F.)

Approximately 60 parts by volume of the oil composition resulting from the mixture of the above components with the solvent extracted oil, was mixed by violent agitation while adding 40 parts by volume of water to form a water-in-oil emulsion. The water was ordinary tap water. The appearance of the emulsion together with the appearances of other emulsions without the barium salt were determined after each emulsion had been allowed to stand for approximately 24 hours or longer with the results listed in Table I below. The effect of temperature variation on each emulsion was also determined. The zinc dialkyl dithiophosphate was present in Composition 2 to impart anti-wear and antioxidant properties to the resulting emulsion, and not stability properties.

very good anti-wear properties of the water-in-oil emulsions of Table II. Compositions 1, 2 and 4 exhibited only 0.09, 0.07 and 0.05 weight percent of wear, respectively. This is very satisfactory.

The dimethyl siloxane was added to Compositions 3 and 4 to prevent foaming. No foaming was observed in the emulsions made up from these compositions.

TABLE I

| Component (Wt./Wt. of oil plus mixture) | Composition | | |
|---|---|---|---|
| | 1 | 2 | 3 |
| Atpet 200 | 4.5 | 4.5 | 4.5. |
| Tween 80 | 0.5 | 0.5 | 0.5. |
| Barium Salt | 4.0 | 0 | 0. |
| Zinc dialkyl dithiophosphate | 0 | 0.5 | 0. |
| Oil Concentrate (Vol. percent) | 60 | 60 | 60. |
| Water (Vol. percent) | 40 | 40 | 40. |
| Emulsion Appearance | No Separation, Smooth Appearance. | Separation of Oil, Curdy-Coagulated Appearance. | Separation of Oil, Curdy-Coagulated Appearance. |
| Stability (cycles of −10° F. to Room Temp.) | 3 (Before trace of water separation). | 0 (With oil appearing as a separate phase). | 0 (With oil appearing as a separate phase). |
| Appearance during Stability Test | | Curdy-Coagulated appearance. | Curdy-Coagulated appearance. |

The above results of Table I demonstrate the superior stability both at room temperature and at −10° F. to room temperature of the emulsion made from the oil composition containing 4.5 parts by weight of Atpet 200 (sorbitan monooleate), 0.5 part by weight of a Tween 80 (polyoxyethylene sorbitan monooleate) and 4.0 parts by weight of the barium salt of a reaction product of $P_2S_5$ and a butylene polymer over the stabilities of emulsions made from oil compositions, containing none of the barium salt. These results demonstrate that the appearance of the emulsion containing the barium salt on standing for approximately 24 hours or longer was smooth with no significant separation while in the emulsions with no barium salt, a separation of the oil had occurred. The emulsion made from the barium salt also withstood three temperature cycles (−10° F. to room temperature) before exhibiting any trace of separation.

*Example II*

Emulsifiable oil compositions were formulated containing the components listed in Table II. In addition to the components described in Example I, about 10 p.p.m. of a dimethyl siloxane having a viscosity of about 1000 centistokes at 25° C. was incorporated into the formulation to impart anti-foam properties to the emulsion.

Approximately 60 parts by volume of the emulsifiable oil composition were mixed by violent agitation with about 40 parts by volume of water to form a water-in-oil emulsion. The emulsion was tested for its anti-wear properties in a Vickers Pump for 1000 hours at a temperature of 150° F., a pressure of 1000 lbs. per square inch., and an input rate of 1.9 gallons per minute. The weight loss of the pump parts (front and rear bushings, rotor, camring and vanes) were measured and it was found that the parts had decreased in weight by the percentages listed in Table II.

TABLE II

| Component (Wt./Wt. of oil plus mixture) | Composition | | | |
|---|---|---|---|---|
| | 1 | 2 | 3 | 4 |
| Atpet 200 | 4.5 | 6.8 | 4.5 | 4.5. |
| Tween 80 | 0.5 | 0.8 | 0.5 | 0.5. |
| Barium Salt | 4.0 | 6.0 | 4.0 | 4.0. |
| Zinc-isopropyl, decyldithiophosphate. | 1.0 | 1.0 | 1.0 | 0.5. |
| Dimethyl siloxane | 0 | 0 | 10 p.p.m. | 10 p.p.m. |
| Emulsion Stability | OK | OK | OK | OK. |
| Pump wear, percent after 1,000 hrs. | 0.09 | 0.07 | 0.21 | 0.07. |

The above results demonstrate the highly desirable stability and with the exception of Composition 3, the

*Example III*

Composition 4 of Example II was tested to determine its viscosity characteristics and its water loss after 1000 hours in the Vickers Pump as described in Example II. It was found that the viscosity of the water-in-oil emulsion was initially 264 SSU at 150° F. before the test and 263 SSU at 150° F. after the test, or virtually unchanged. It was also found that the volume of water was approximately 40% by volume before the test and approximately 36% by volume after the test, or approximately a loss of water of about 4% (vol.) during the test.

The composition was also tested for its emulsion stability, foaming tendencies, lubricity, anti-wear properties, and corrosive properties. Its emulsion stability remained unchanged after the 1000 hour test. No foaming tendencies were noted in the emulsion. The lubricity test carried out by the Falex Test revealed that the emulsion after the 1000 hour test withstood a jaw load of over 2500 lbs. and a torque of approximately 28 inch lbs. The pump wear was determined to be approximately 0.09 weight percent. In the test to determine the emulsion's anti-corrosive properties, a specimen of iron and a specimen of brass were individually placed in a sample of the emulsion in which the specimen was completely covered by the emulsion. The covered specimens were then placed in an oven at 150° F. for four days. After the four day period, the weight change in each specimen was determined. It was found that the iron sample had increased in weight due to the corrosion in an amount of approximately 0.5 milligram per square inch of sample. It was also found that the brass sample had decreased in weight in an amount of approximately 0.5 milligram per square inch.

The above results were compared with those of a commercial water-in-oil emulsion for hydraulic systems. The commercial emulsion (in comparison with the emulsion of Example III) had a viscosity change of from 164 down to 115 SSU at 150° F. (compared to 264 to 263 SSU), a 9% volume loss of water (compared to 4%) and a Falex Test after the 1000 hour test of approximately 500 lbs. for the jaw load portion (compared to 2500 lbs.) and only 5 inch lbs. for the torque portion (compared to 28 inch lbs.). The pump wear was 0.05 (compared to 0.09). In the corrosion test, the iron sample increased approximately 3.0 mg./in.$^2$ (compared to 0.5 mg./in.$^2$) while the brass sample decreased in weight by 0.5 mg./in.$^2$ (compared to 0.5 mg./in.$^2$). Comparison of the properties of the inventive emulsion (especially its viscosity, water retention, results in the Falex Test, satisfactory pumpwear, and low corrosive properties) with those of the commercial emulsion further reveals the superior performance of the inventive emulsion.

Example IV

Composition 4 of Example II was further tested as part of water-in-oil emulsions which contained various amounts of a glycol or glycerine. The glycol or glycerine was added to the water prior to the formation of the emulsion. The emulsions were then subjected to a stability test. The stability test consisted of subjecting the emulsion to various conditions of temperature. The emulsion was subjected to room temperature for approximately 72 hours, after which it was cooled to approximately −10° F. for approximately 24 hours and then, after the determination of its stability, was heated to approximately 150° F. for four hours, after which its stability was again determined and then heated for 20 additional hours with still another determination of its stability being taken. The results are listed in Table III below:

TABLE III

| Components (Vol. Percent) | 1 | 2 | 3 | 4 | 5 |
|---|---|---|---|---|---|
| Composition 4 of Example II | 60 | 60 | 60 | 60 | 60. |
| Water | 40 | 40 | 40 | 40 | 40. |
| Ethylene Glycol | 0 | 5 | 0 | 0 | 0. |
| Propylene Glycol | 0 | 0 | 5 | 0 | 0. |
| Glycerine | 0 | 0 | 0 | 5 | 0. |
| Hexylene Glycol | 0 | 0 | 0 | 0 | 5. |
| Emulsion Stability: | | | | | |
| Initial | No sep | No sep | No sep | No sep | No sep. |
| 72 hrs. at RT | No sep | No sep | No sep | No sep | No sep. |
| 24 hrs. at −10° F | Solid | Fluid | Fluid | Fluid | Solid. |
| 4 hrs. at 150° F | No sep | No sep | No sep | No sep | Compl. sep. |
| 24 hrs. at 150° F | Slight oil sep | Slight oil sep | Slight oil sep | Slight oil sep | |

The above results demonstrate the beneficial effect of a lower alkyl glycol and glycerine in a water-in-oil emulsion to improve low temperature properties. The emulsion without these polyols was solid after 24 hours at −10° F. while the emulsion with 5 volume percent of ethylene glycol, or with 5 volume percent of propylene glycol, or with 5 volume percent of glycerine was fluid after the test at −10° F. for 24 hours. It should be noted that all four of the emulsions (excepting that with hexylene glycol) exhibited very good stability properties at room temperature and at 150° F.

Thus having described the invention, what is claimed is:

1. A water-in-oil emulsion suitable for use as a fire resistant hydraulic fluid consisting essentially of:
   (A) about 30–50 vol. percent water;
   (B) about 50–70 vol. percent of a mineral lubricating oil having a viscosity of about 80–200 SSU at 100° F. containing
      (a) about 7–15 wt. percent of a mixture consisting of
         (i) about 0.1–1 parts by wt. of a polyoxyalkylene derivative of a fatty partial ester of a 6 carbon polyhydric alcohol mono- and di-anhydride and mixtures thereof, said derivative containing 1–4 carbon atoms in the alkylene radical;
         (ii) about 3–6 parts by wt. of a fatty acid partial ester of a 6 carbon polyhydric alcohol mono- and di-anhydride and mixture thereof, wherein said fatty acid has from 6 to 30 carbon atoms;
         (iii) about 3–6 parts by wt. of a barium salt of the hydrolyzed reaction product of $P_2S_5$ and a butylene polymer having a molecular weight of about 150–50,000; and
      (b) 0–1 vol. wt. percent of zinc di($C_{1-20}$ alkyl) dithiophosphate;
   (C) 0–5 vol. percent of a member of the group consisting of ethylene glycol, propylene glycol or glycerine; and
   (D) 0–30 parts per million of a polyalkyl siloxane having a viscosity of about 200–1000 centistokes at 25° C.

2. The composition of claim 1 wherein (i) is the polyoxyethylene derivative of sorbitan; and (ii) is the partial ester of sorbitan.

3. The composition of claim 1 wherein (b) is about 0.3–0.7.

4. The composition of claim 1 wherein:
   (A) is about 40%;
   (B) is about 60%;
      (i) is about 0.5 part by wt. polyoxyethylene sorbitan mono-oleate;
      (ii) is about 4.5 parts by wt. sorbitan mono-oleate;
      (iii) is about 4.0 parts by wt.;
         (b) is about 0.5–1% of zinc di-(isopropyl-, decyl-) dithiophosphate; and
   (D) is 10 p.p.m. of dimethyl siloxane.

References Cited

UNITED STATES PATENTS

| 2,965,574 | 12/1960 | Tierney et al. | 252—78 |
| 2,961,408 | 11/1960 | Havely et al. | 252—75 |
| 3,002,925 | 10/1961 | Sabol et al. | 252—32.7 |
| 2,375,007 | 5/1945 | Larsen et al. | 252—318 X |

LEON D ROSDEL, *Primary Examiner.*

SAMUEL L. BLECH, *Examiner.*

S. D. SCHWARTZ, *Assistant Examiner.*

UNITED STATES PATENT OFFICE
CERTIFICATE OF CORRECTION

Patent No. 3,360,468                         December 26, 1967

Edgar A. Dieman et al.

It is hereby certified that error appears in the above numbered patent requiring correction and that the said Letters Patent should read as corrected below.

Column 8, line 2, for "mixture" read -- mixtures --; line 9, strike out "vol.".

Signed and sealed this 28th day of January 1969.

(SEAL)
Attest:

Edward M. Fletcher, Jr.                         EDWARD J. BRENNER

Attesting Officer                                Commissioner of Patents